(No Model.)

W. H. SHORTSLEEVE.
WHEEL CARRYING FRAME FOR SULKIES.

No. 490,929. Patented Jan. 31, 1893.

Witnesses

William H. Shortsleeve, Inventor

United States Patent Office.

WILLIAM H. SHORTSLEEVE, OF CHICOPEE FALLS, MASSACHUSETTS, ASSIGNOR TO THE OVERMAN WHEEL COMPANY, OF HARTFORD, CONNECTICUT.

WHEEL-CARRYING FRAME FOR SULKIES.

SPECIFICATION forming part of Letters Patent No. 490,929, dated January 31, 1893.

Application filed November 21, 1892. Serial No. 452,706. (No model.)

*To all whom it may concern:*

Be it known that I, WILLIAM H. SHORTSLEEVE, of Chicopee Falls, in the county of Hampden and State of Massachusetts, have invented a new Improvement in Wheel-Carrying Frames for Pneumatic Sulkies; and I do hereby declare the following, when taken in connection with accompanying drawings and the letters of reference marked thereon, to be a full, clear, and exact description of the same, and which said drawings constitute part of this specification, and represent, in—

Figure 1:
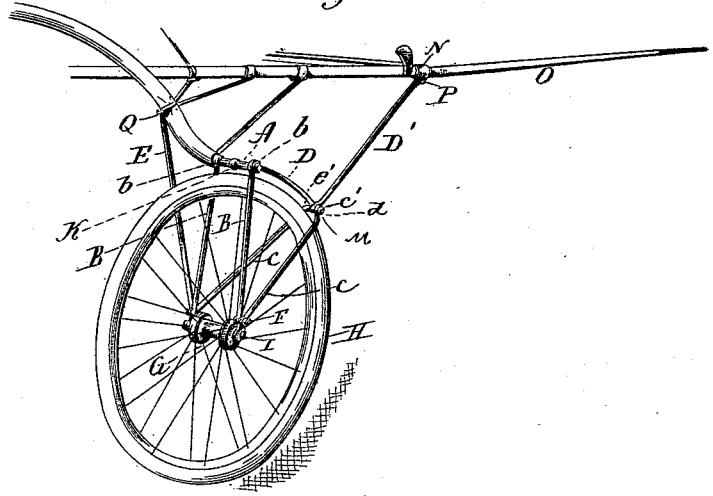
Figures 2, 3, 4, 5, 6:
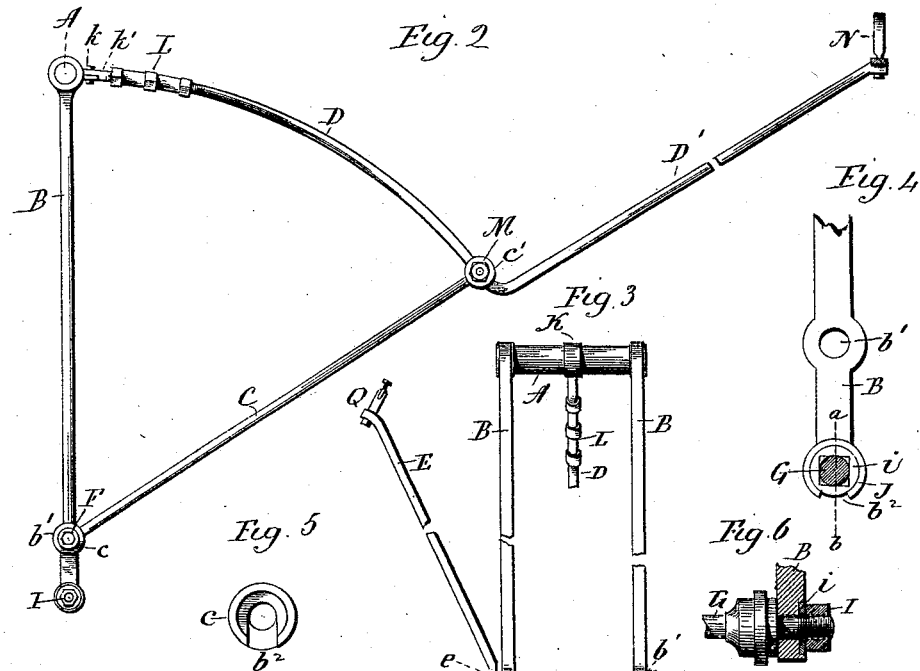

Figure 1, a rear view in perspective, showing the application of a frame constructed in accordance with my invention to a sulky, only a portion of which is shown. Fig. 2, a detached view of the frame in outside side elevation. Fig. 3, a rear view of the frame. Fig. 4, a detached broken view in side elevation of the lower end of one of the supporting-members of the frame, showing one end of the axle and the washer which locks it in its place. Fig. 5, a corresponding view with the said washer removed. Fig. 6, a sectional view on the line $a-b$ of Fig. 4, showing also the nut which is placed on the end of the axle.

My invention relates to an improved wheel-carrying frame for converting an ordinary racing-sulky into what is now known as a pneumatic sulky, which is a racing sulky, the regular wheels whereof have been replaced by small steel wheels, built on the suspension principle, and furnished with pneumatic tires, the object of my present invention being to produce a frame adapted to be attached to the axle of a sulky, and combining lightness and strength, and stayed to resist direct and lateral strain.

With these ends in view, my invention consists in a wheel-carrying frame having certain details of construction and combinations of parts as will be hereinafter described, and pointed out in the claims.

My improved frame is composed, essentially, of a sleeve A, two corresponding supporting members B B, two corresponding draft members C C, a main stay D, D', and a secondary stay E, the said parts being combined so as to form an independently organized structure, which may be readily applied to and removed from the axle of an ordinary sulky, or even to the axle of a vehicle of a different type, in place of the wheels commonly used on such vehicles. The sleeve A, is preferably made from a short piece of steel tubing, embraced at its two ends by eyes $b\ b$, formed at the upper ends of the said supporting members B B, which are provided near their lower ends with eyes $b'\ b'$ (Fig. 3,) to which are secured by bolts F F, the rear or inner ends of the draft-members C C, the same being thereto provided with eyes $c\ c$.

The extreme lower ends of the members B B, are constructed with vertical slots $b^2\ b^2$ opening downward, to receive the flattened ends of the axle G, upon which the small wheel H, runs, the same being built on the suspension principle, having a pneumatic tire, and being, in fact, such a wheel as might be used on a safety bicycle. The axle is secured in place in the said slots by means of washers $i\ i$, see Fig. 4, which set into circular recesses $i'\ i'$, (see Fig. 5) formed in the outer faces of the lower ends of the said members, concentric with the inner ends of the said slots $b^2\ b^2$, which, as it were, intersect their lower edges. The said washers are secured in place by means of nuts I I, (Fig. 6) screwed onto the ends of the axle, which are thereto threaded. It will be understood from this construction that when the washers $i\ i$ are passed over the ends of the axle G, and seated in their recesses, the axle G, is locked in place. To remove the axle, and hence the wheel, the said nuts I I, are removed, and the washers $i\ i$ lifted out of their recesses, thus permitting the axle to freely slip out of the slots $b^2\ b^2$. The said sleeve A, is provided midway of its length, with a strap K, secured in place by a bolt $k$, and having a threaded end $k'$, which is entered into the inner end of a right and left hand coupling L, the forward end whereof receives the inner end of the stay D D', which is thus made longitudinally adjustable and easily so. The said stay is made as herein shown, in one piece, although if desired, its portions D and D', might be made independent of each other. From the said coupling L, the portion D, of the said stay bows outwardly to an eye $d$ formed in it, and receiving a bolt M, by means of which the forward ends of the draft members C C, of the frame are secured to the said stay, the said members being thereto provided with eyes c' c'. The said bowed portion of the stay conforms to the curvature of the wheel, and has its main function in giving rigidity and stability to the frame to which it also adds a pleasing and proportional appearance, besides making it resilient, for, being bowed, the said portion of the frame will spring to some extent. The portion D' of the stay is made straight, but bent inward with reference to the vertical plane of the frame, thus forming an oblique angle with the rear portion D, of the stay, it being necessary to bend the outer portion of the stay, as described, for its attachment to the vehicle shaft O, for which it is furnished with a clip P, or some equivalent thereof. This stay takes the main draft of the vehicle. In order, however, to better adapt the frame to resist lateral strain, I provide the secondary stay E, which is attached to the inner of the two supporting members B, by the same bolt F, that is employed to connect the inner of the draft-members C, with the said supporting member, the said stay being thereto provided at its lower end with an eye e. At its upper end the stay is provided with a clip Q, by means of which it is attached to the axle G. A frame thus constructed is not only very rigid and strong in itself, but also adapted to have a very firm connection with the vehicle to which it is applied.

I am aware that wheel-carrying frames for the conversion of ordinary sulkies into pneumatic sulkies are old, and that it is broadly old to make a frame with supporting and draft members, and a main stay having the general form and arrangement of the supporting and draft members and the stay that I employ, except that heretofore the stay has not been extended back of the forward ends of the draft members of the frame.

I would have it understood that I do not limit myself to the exact construction herein set forth, but hold myself at liberty to make such changes and alterations as fairly fall within the spirit and scope of my invention.

Having fully described my invention, what I claim as new and desire to secure by Letters Patent is:—

1. In a wheel-carrying frame, the combination with a sleeve adapted to fit over a wheel-axle, of two supporting members attached at their upper ends to the said sleeve, and adapted at their extreme lower ends to receive a wheel-axle, two draft members connected to the lower ends of the said supporting members, and a stay extending from the sleeve forward to the forward ends of the draft members which are fixed to it, and thence forward for attachment to a vehicle shaft, substantially as set forth.

2. In a wheel-carrying frame, the combination with a sleeve adapted to fit over a wheel-axle, of two supporting members attached at their upper ends to the said sleeve, and adapted at their extreme lower ends to receive a wheel-axle, two draft-members connected to the lower ends of the said supporting members, and a stay extending in bowed form from the sleeve forward to the forward ends of the draft-members which are fixed to it, and thence forward for attachment to a vehicle-shaft, substantially as described.

3. In a wheel-carrying frame, the combination with a sleeve adapted to fit over a wheel axle, of two supporting members attached at their upper ends to the said sleeve, and adapted at their extreme lower ends to receive a wheel-axle, two draft-members connected to the lower ends of the said supporting members, a stay extending from the sleeve forward to the forward ends of the draft members which are fixed to it, and thence forward for attachment to a vehicle-shaft, and means for adjusting the said stay, longitudinally, substantially as set forth.

4. In a wheel-carrying frame, the combination with a sleeve adapted to fit over a wheel-axle, of two supporting members attached at their upper ends to the said sleeve, and adapted at their extreme lower ends to receive a wheel-axle, two draft members connected to the lower ends of the said supporting members, and a stay extending from the sleeve forward to the forward ends of the said draft members, where it is made with an eye, permitting them to be bolted to it, and thence extending forward for attachment to a vehicle shaft, the said stay being made in one piece, substantially as set forth.

5. In a wheel-carrying frame, the combination with a sleeve adapted to fit over a wheel-axle, of two supporting members attached at their upper ends to the said sleeve, and adapted at their extreme lower ends to receive a wheel-axle, two draft members connected to the lower ends of the said supporting members, a stay extending from the sleeve forward to the forward ends of the draft-members which are fixed to it, and thence forward for attachment to a vehicle shaft, and a secondary stay connected to the lower end of one of the said members, and extending inward and upward for attachment to the vehicle-axle, substantially as set forth.

6. In a wheel-carrying frame, the combination with a sleeve adapted to fit over a wheel-axle, of two supporting members attached at their upper ends to the said sleeve, and constructed at their lower ends with eyes, and below the same with vertical slots, two draft members having their inner ends bolted to the said eyes, and a stay for connecting the forward ends of the draft members with a vehicle shaft, substantially as described.

7. In a wheel-carrying frame, the combination with a sleeve adapted to fit over a wheel-axle, of two supporting members attached at their upper ends to the said sleeve, and constructed at their lower ends with open vertical slots opening downward and with circular recesses, formed in their outer faces, concentric with the inner ends of the said slots which intersect their lower edges; washers to fit into the said recesses, and two draft-members attached to the lower ends of the said supporting members, and a stay for connecting the forward ends of the draft members with a vehicle-shaft, the said slots of the supporting members being designed to receive the axle of the wheel carried by the frame, substantially as described.

In testimony whereof I have signed this specification in the presence of two subscribing witnesses.

WILLIAM H. SHORTSLEEVE.

Witnesses:
A. H. BENTON,
C. E. W. WOODWARD.